E. BELL.
GLASS ETCHING MACHINE.
APPLICATION FILED DEC. 23, 1912.
1,073,586.
Patented Sept. 23, 1913.
5 SHEETS—SHEET 1.
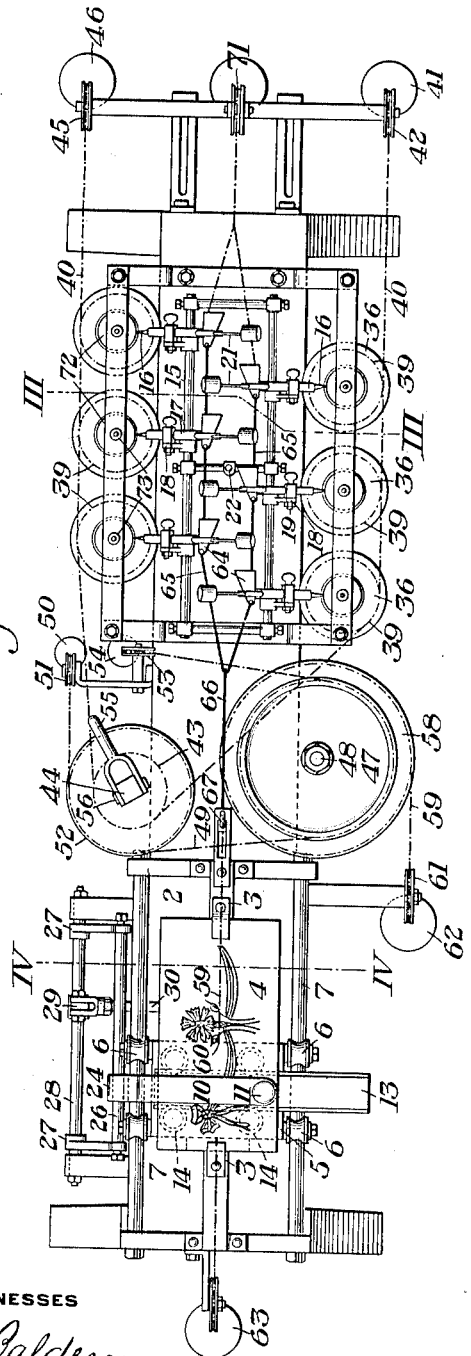
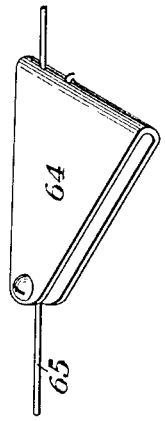
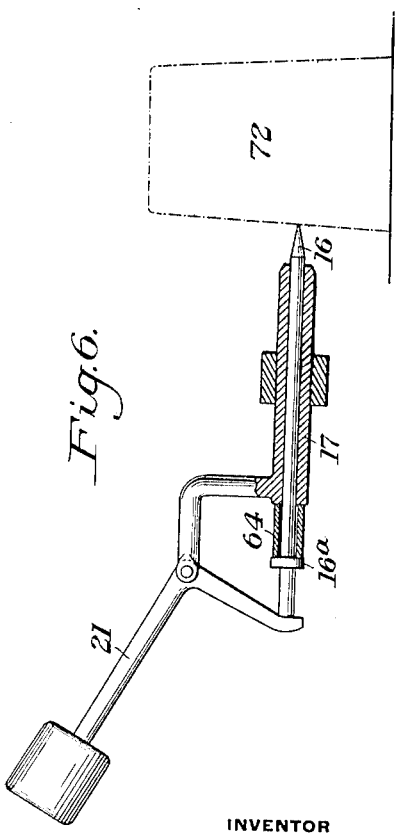
WITNESSES
INVENTOR
Elmer Bell
by Bakewell, Byrnes & Parmelee
Attys.

E. BELL.
GLASS ETCHING MACHINE.
APPLICATION FILED DEC. 23, 1912.
1,073,586.
Patented Sept. 23, 1913.
5 SHEETS—SHEET 2.
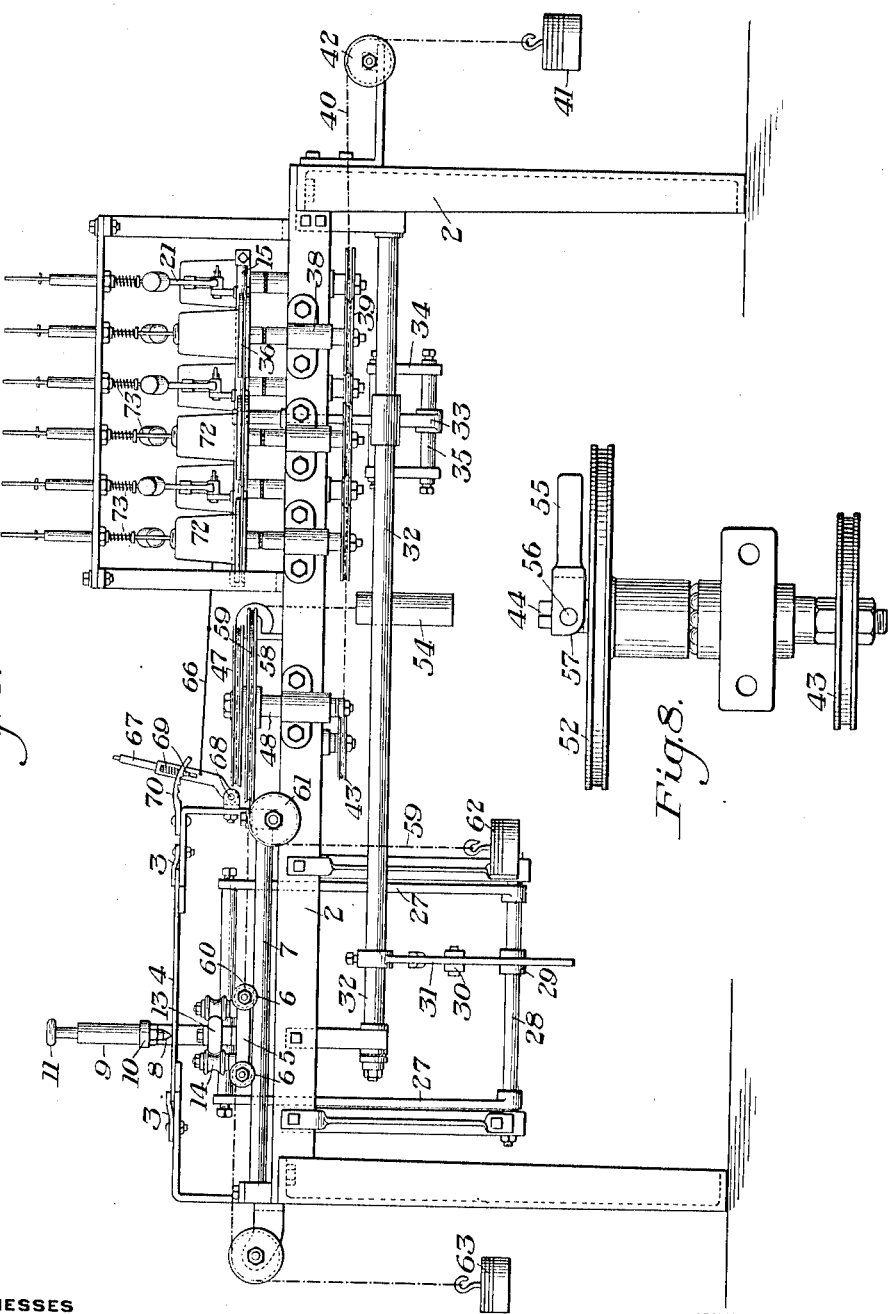
WITNESSES
R A Balderson
INVENTOR
Elmer Bell,
by Bakewell, Byrnes & Parmelee
Attys.

E. BELL.
GLASS ETCHING MACHINE.
APPLICATION FILED DEC. 23, 1912.

1,073,586.

Patented Sept. 23, 1913.
5 SHEETS—SHEET 3.

E. BELL.
GLASS ETCHING MACHINE.
APPLICATION FILED DEC. 23, 1912.

1,073,586.

Patented Sept. 23, 1913.
5 SHEETS—SHEET 4.

WITNESSES

INVENTOR

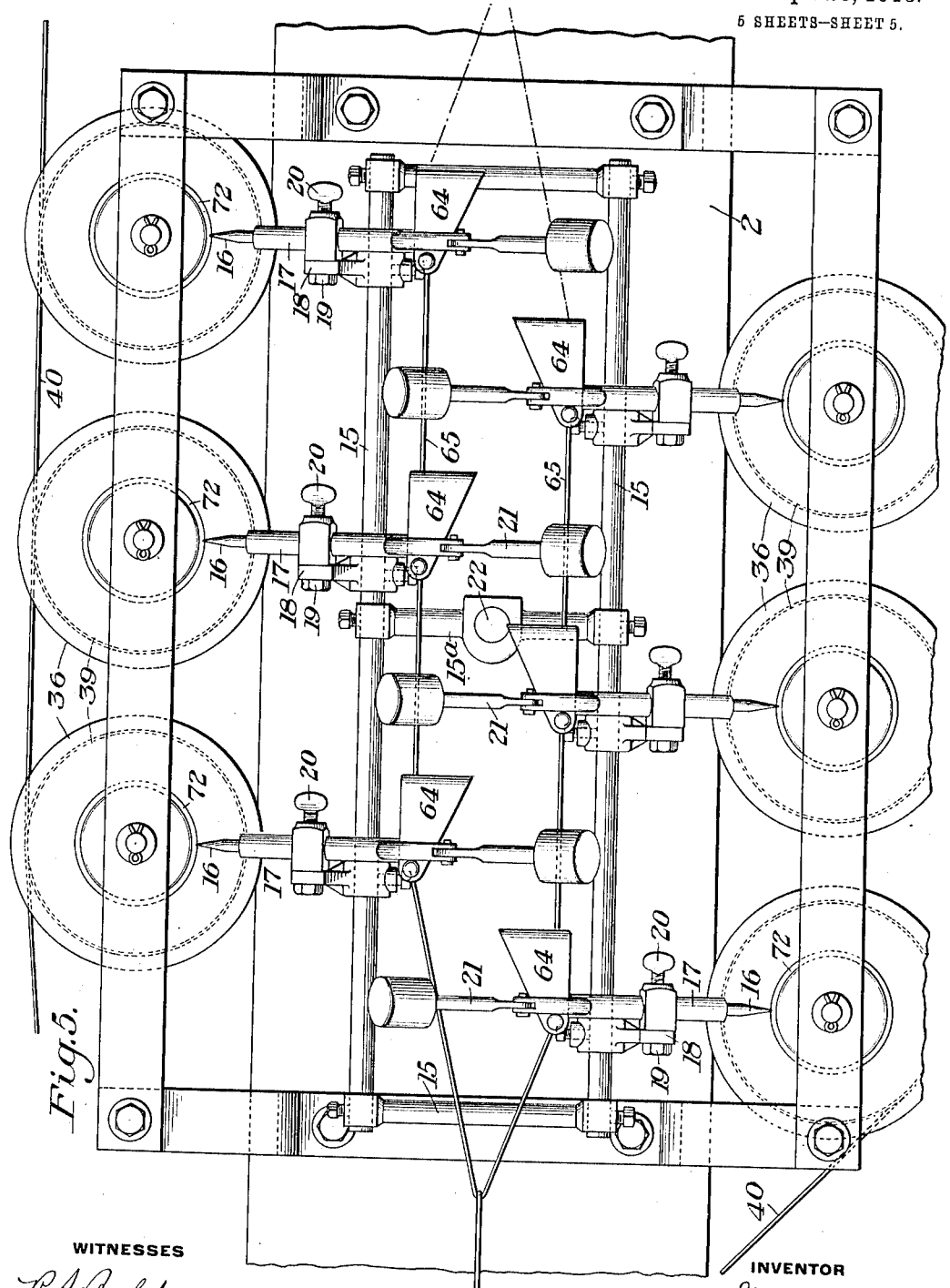

UNITED STATES PATENT OFFICE.

ELMER BELL, OF MOUNT PLEASANT, PENNSYLVANIA, ASSIGNOR TO BRYCE BROTHERS COMPANY, OF MOUNT PLEASANT, PENNSYLVANIA, A CORPORATION OF PENNSYLVANIA.

GLASS-ETCHING MACHINE.

1,073,586.

Specification of Letters Patent. Patented Sept. 23, 1913.

Application filed December 23, 1912. Serial No. 738,181.

*To all whom it may concern:*

Be it known that I, ELMER BELL, a citizen of the United States, and resident of Mount Pleasant, Westmoreland county, Pennsylvania, have invented a new and useful Improvement in Glass-Etching Machines, of which the following is a full, clear, and exact description, reference being had to the accompanying drawings, forming part of this specification, in which—

Figure 3:
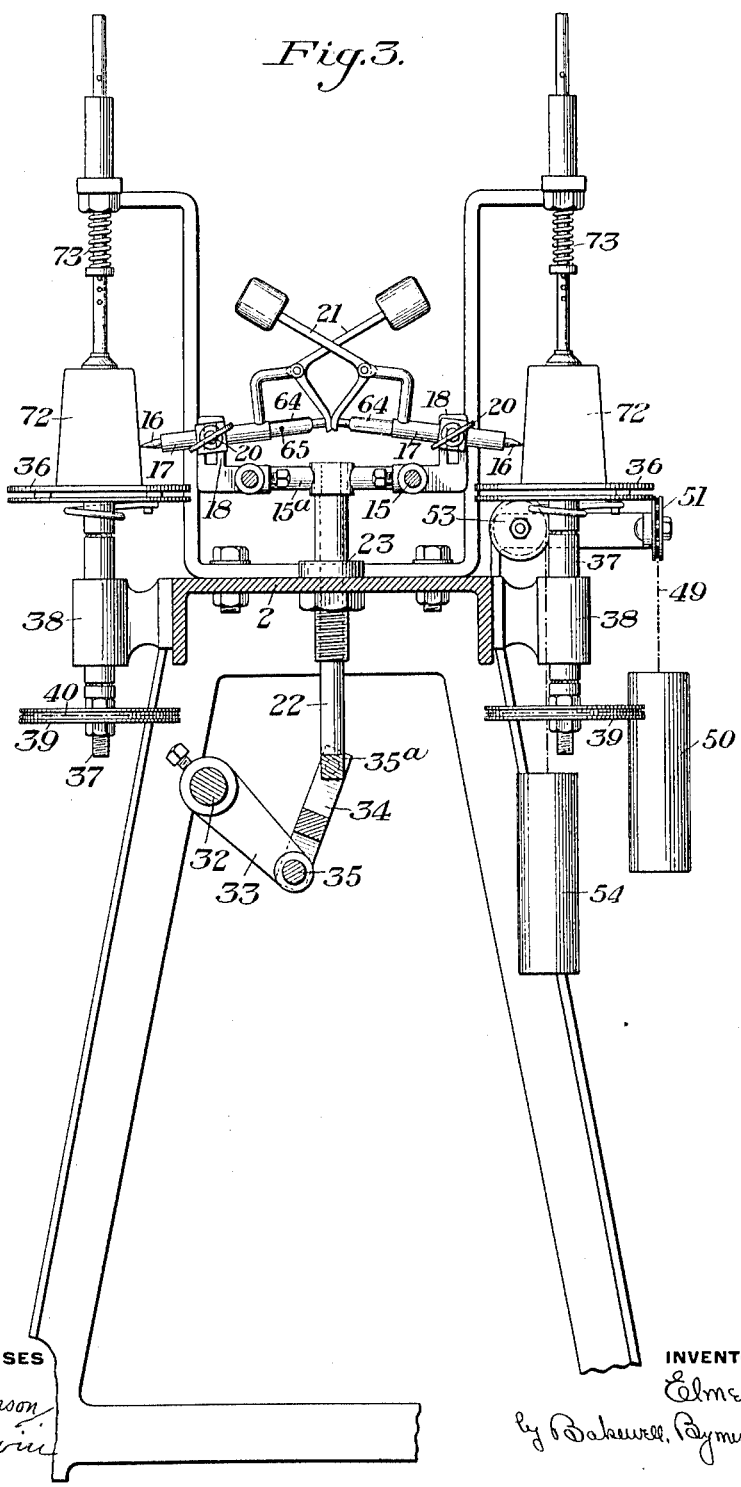
Figure 4:
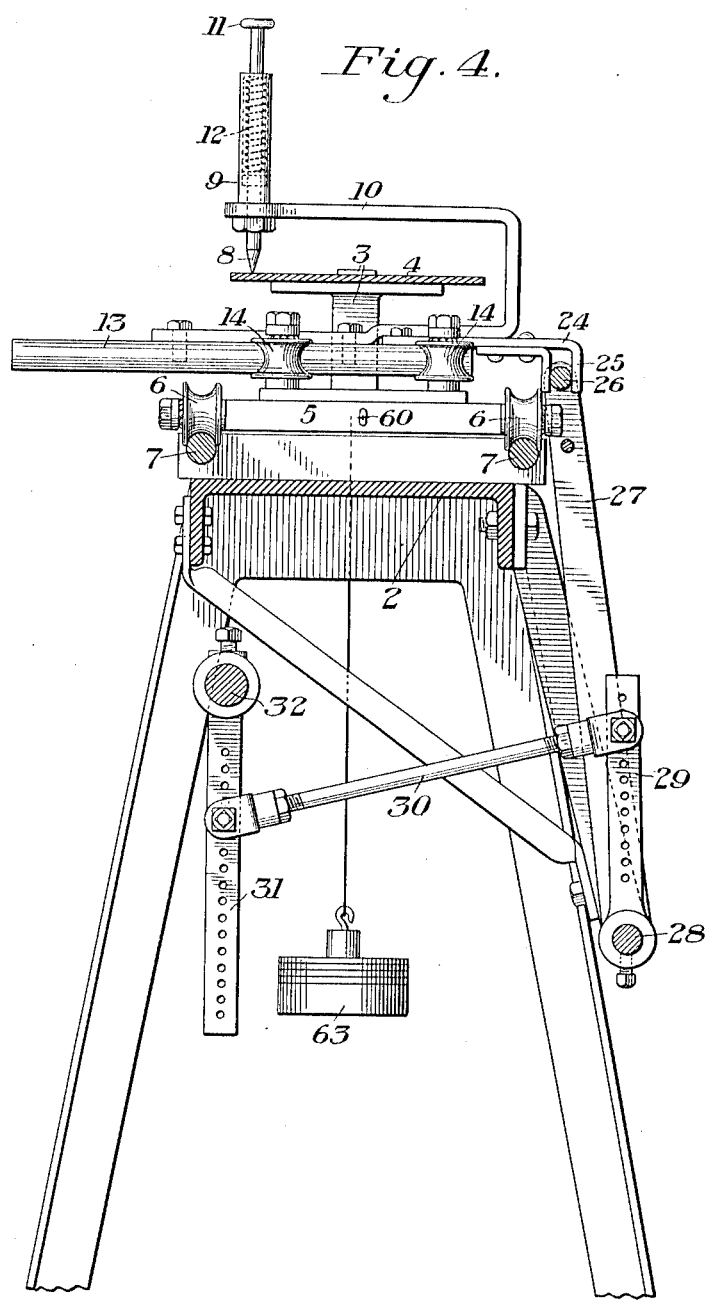

Figure 1 is a plan view of a machine embodying my invention; Fig. 2 is a side elevation of the same; Figs. 3 and 4 are sections on the lines III—III and IV—IV respectively of Fig. 1; Fig. 5 is a plan view of a portion of the machine on a larger scale; Fig. 6 is a detail sectional view of one of the etching needles; Fig. 7 is a perspective view of one of the cam devices; and Fig. 8 is a detail view of a portion of the machine hereinafter more fully described.

My invention has relation to glass etching machines, and is designed to provide a machine of this class which can be easily operated, which is simple in its construction and adjustment, and by means of which various designs can be accurately etched upon the articles.

My invention relates more particularly to a multiple machine, in which the same pattern is simultaneously etched upon a plurality of objects.

In general, it consists of a pantographic device having a tracing point adapted to follow the outlines of a pattern and capable of a universal movement. The two components of these movements in directions at right angles to each other are transmitted respectively to the article supports, and to the etching needles. The machine also comprises novel means for transmitting these movements to the article supports and to the needles; and also a novel arrangement of the pantographic apparatus, and of the needles and needle-holding arrangements.

The entire machine further embodies novel features whereby lost motion is eliminated and the moving parts are so balanced as to be easily and freely operated.

Referring to the accompanying drawings, the numeral 2 designates the supporting frame of the machine, which may be, in general, of any suitable character for the purpose. This machine is provided at one end portion with suitable supporting brackets and clamps 3 for the pattern plate 4, which carries the design to be reproduced upon the glass articles.

5 designates a pantograph carriage, which is mounted for longitudinal movement upon the frame. As shown, this mounting consists of a plurality of ball bearing grooved wheels or rollers 6 on the carriage, and which are arranged to travel on tracks consisting of cylindrical rods 7.

8 designates a tracing point or needle, which is mounted in a vertical sleeve 9 carried by an arm 10, which overhangs the pattern plate in the manner best shown in Fig. 4. The needle 8 is provided with a button or handle 11 at its upper end, and within the sleeve 9 is provided with a spring 12 which normally tends to hold the needle in contact with the pattern plate. The arm 10 is secured to a transversely movable bar 13, which is arranged to reciprocate on the carriage between the ball bearing antifriction rollers 14.

The longitudinal movement of the carriage as a whole, combined with the transverse movement of the bar 13, gives the tracing point or needle 8 capability of universal movement in following the outlines of the pattern.

15 designates the etching frame, which is shown as of oblong retangular form, and upon which are mounted a plurality of etching needles 16. Each of these needles is mounted loosely in a sleeve 17 (as best shown in detail in Fig. 6), said sleeve being capable of a vertical adjustment in an upwardly projecting arm 18 of the frame 15, the desired adjustment being fixed by means of the clamping bolt 19. Each sleeve 17 is also capable of an angular adjustment, which is fixed by the clamping screw 20. Each needle is pressed inwardly with uniform pressure against the article to be etched by means of a weighted lever 21, which engages the rear end of the needle shank, as best shown in Fig. 6.

A portion of the needles are mounted upon one of the side bars of the frame 15, and the remaining needles upon the opposite side bar, the two sets of needles being in staggered or alternating relation. The frame 15 is capable of a vertically reciprocating movement imparted to it by the vertical rod 22, which is connected to a central crossbar 15ᵃ in said frame, and which is guided at 23 in the main frame 2.

The transverse elements of the movements of the tracing needle are transmitted to the etching frame to produce vertical movements thereof in the following manner: The bar 13 before described has secured thereto a laterally projecting arm 24, carrying a fork or jaw 25, which embraces a longitudinal rod 26 parallel to the longitudinal axis of the machine. This rod 26 is carried between the upper end portions of two levers 27, whose lower end portions are pivoted on a rod or shaft 28. This rod or shaft has an upwardly extending arm 29, to which is adjustably connected one end of a link 30. The other end of this link is adjustably connected to a depending arm 31 of a rocker shaft 32. This rocker shaft extends along the machine to the opposite end thereof and has an arm 33 connected to the rod or plunger 22 by means of the yoke link 34 and the pins 35 and trunnions 35ᵃ. It will be readily seen that the transverse movements of the bar 13 will oscillate the levers 27, thereby rocking the shaft 28, and through the connections described will produce corresponding vertical movements of the etching frame and its needles. These movements of the frame and needles can be made to bear any desired ratio to the transverse movements of the tracing needle 8 by varying the points of connection of the link 30 with the arms 29 and 31.

36 designate rotary article supports, which are arranged at each side of the etching frame in such a manner that one of the etching needles will project over each support. Each of these supports is carried on a vertical spindle 37, mounted in suitable bearings 38 carried by the frame 2, and having secured to its lower end a grooved pulley wheel 39.

40 is a flexible member, preferably a wire cord, which is connected at one end to a counterweight 41 at one side of the rear end of the machine, and which passes upwardly over a guide wheel 42, and thence forwardly, being looped around the series of grooved pulleys 39 at one side of the machine. It is then carried across to the opposite side of the machine and around a pulley 43 on a vertical shaft 44, and thence backwardly around the series of pulleys 39 at the opposite side of the machine, its other end portion passing downwardly over the guide pulley 45 and being connected to a weight 46. The pulley 43 is fixed to the shaft 44 and is arranged to be driven from a pulley 47 on a vertical shaft 48 by a flexible cord or band 49. One end of this cord or band is connected to a weight 50, and passes up over a guide pulley 51, thence around a pulley 52 loosely mounted on the shaft 44, thence around the pulley 47, and then over a guide pulley 53 to a weight 54 which is attached to its opposite end. The pulley 52, which, as above stated, is loosely mounted on the shaft 44, is arranged to be connected with and disconnected from said shaft through the medium of a suitable clutch. One form of such clutch is shown in detail in Fig. 8. It consists of a clutch lever 55 pivoted at 56 to the upper squared end of the shaft 44, and having a cam end 57, which, when the lever is moved from a horizontal to a vertical position, is adapted to make a clutch contact with the upper face of the pulley 52. Normally, the lever 55 is in such position as to effect a clutch engagement with the pulley 52.

The shaft 48, on which the pulley 47 is mounted as before described, also carries a pulley 58 fixed thereto. A flexible cord or band 59 passes around this pulley 58, one of its ends being connected to the pantograph carriage at 60 and its other end passing downwardly over a guide pulley 61 to a weight 62.

The connections just described form means whereby the longitudinal movements of the tracing point or needle 8 are caused to effect corresponding rotary movements of the article supports 36. The longitudinal movements of the carriage oscillate the pulley 58 through the cord or band 59; and these movements are transmitted by the cord or band 49 to the pulley 52, thence to the pulley 43, and thence by the cord or band 40 to the series of pulleys 39 which are on the article-supporting spindles. The various cords or bands are preferably composed of a steel wire of such a character that it will not stretch or vary in length.

63 designates a weighted balance connection for the table, this weight acting in opposition and balancing the action of the weight 62. The two weights 50 and 54 act as a mutual balance for each other, as do also the weights 41 and 46. It will be seen, therefore, that the movable parts to which these weights are connected are balanced in such a manner as to insure great freedom of motion with the expenditure of but little effort or power. To further insure the easy action of the machine, ball bearings are preferably provided wherever advisable.

For the purpose of simultaneously retracting the series of etching needles, I may provide means such as will now be described.

64 designates slotted cam or wedge members, one of which embraces the shank of each of the needles 16 between the end of its sleeve 17 and a collar 16ᵃ on the shank. (See Fig. 6.) These several wedge or cam members are connected with each other as indicated at 65, and a cord or cable 66 extends from these connections 65 to a hand lever 67 pivoted to the main frame at 68 and having a spring pawl 69 adapted to engage a rack bar 70. By releasing the pawl 69 and operating the lever 67, the series of wedges can all be drawn forwardly between the collars 16ª and the sleeves 17 to thereby retract the needles. A weighted counterbalance connection 71 can be provided for operating the cam or wedge members in the reverse direction to cause the needles to return to operative positions.

72 designate the articles to be etched and 73 clamping means of any usual or suitable character for holding them to the supports 36.

The operation of the machine will be readily understood from the foregoing.

The operator manipulates the tracing needle 8 to follow the outlines of the pattern on the pattern plate 4. The transverse movements of the tracing needle are transmitted in the manner before described to effect vertical movements of the etching needles; while the longitudinal movements of the tracing point are transmitted to the series of article supports 36 to effect corresponding oscillatory movements thereof. Ordinarily, the pattern on plate 4 is not of sufficient length to extend entirely around the articles when reproduced thereon; and in some cases it may be desired to reproduce this pattern a number of times upon the same article so as to cause it to extend around the entire, or any desired portion, of the circumference thereof. This may be done by throwing the clutch lever 55 to the position shown in Fig. 8 and then moving the pantograph carriage back to its starting point. The disconnection of the clutch lever 55 will prevent backward rotation of the article supports during the return movement of the carriage, so that when the clutch lever 55 is again moved into clutching position, and the tracing movement of the carriage is again started, the pattern will be reproduced upon the articles as a continuation of the first reproduction.

The advantages of my invention will be apparent to those skilled in the art, since it provides a simple machine by which any desired pattern can be reproduced simultaneously upon a plurality of articles with great rapidity and accuracy. The machine can be readily adjusted for various sizes and shapes of articles.

While in the machine shown there are six article supports and a corresponding number of etching needles, it will be readily understood that the number of supports or needles can be very considerably increased without in any way departing from the principles of my invention.

It will also be obvious that various other changes can be made in the details of construction and arrangement of the several parts without departing from the spirit and scope of my invention as defined in the appended claims.

What I claim is:—

1. An etching machine having an article support rotatable about a vertical axis, a vertically movable etching needle, and a universally movable tracing carriage, together with connections between said carriage and the article support and needle whereby one set of movements of the carriage effect a vertical movement of the needle and the other set of movements of the carriage effect a rotary movement of the article support; substantially as described.

2. An etching machine having a rotary article support, and a vertically movable etching needle, said support and needle being at one end portion of the machine, a pantograph carriage mounted for movement in one direction on the machine at the opposite end portion thereof, a tracing needle mounted on said carriage and capable of an independent movement in a direction at substantially right angles to the movement of the carriage, and connections for transmitting these respective movements to the etching needle and the article support; substantially as described.

3. An etching machine comprising a plurality of rotary article supports arranged in two opposite sets, an etching frame movable vertically between the two sets of supports and having a plurality of etching needles, a universally movable tracing point, and connections operated by the movements of said point for effecting proportional movements of the etching frame and the series of article supports; substantially as described.

4. An etching machine comprising a plurality of rotatable article supports arranged in two opposite sets, an etching frame movable vertically between two sets of supports and carrying a plurality of etching needles, a tracing point, and connections whereby the movements of said point in one direction effect proportional movements of the etching frame and needles, and other connections whereby the movements of the tracing point in another direction effect proportional movements of the article supports; substantially as described.

5. An etching machine comprising a longitudinally movable carriage, a tracing point capable of independent transverse movement on said carriage, a movable etching tool, a movable article support, and connections whereby the longitudinal and transverse movements of the carriage and tracing point effect proportional movements of the etching tool and article support, together with means for counterbalancing the movements of the carriage and tracing point, substantially as described.

6. An etching machine comprising a longitudinally movable carriage, a tracing point mounted for movement with said carriage, and also for independent transverse movement thereon, and opposing counterweights connected to said carriage; substantially as described.

7. An etching machine comprising a series of rotatable article supports having pulleys, and a flexible cord looped around all of said pulleys and having a weight at each of its ends; substantially as described.

8. An etching machine comprising a rotatable article support, a flexible driving member for said support, balancing means attached to the flexible driving member, a movable pantograph carriage, and actuating connections between said carriage and the driving member for the article support whereby certain movements of the carriage are transmitted to said support; substantially as described.

9. An etching machine having a rotatable article support, a vertically movable tool carrier adjacent to said support, a movable pantograph carriage, counterbalancing means for said carriage, connections between the carriage and the tool carrier whereby certain movements of the carriage effect vertical movements of the tool carrier, and other connections between the carriage and the article support whereby other movements of the carriage effect a rotary movement of said support; substantially as described.

10. An etching machine comprising a plurality of article supports, a flexible driving member for said supports, and balancing means attached to said driving member; substantially as described.

11. An etching machine comprising a plurality of rotary article supports, having pulleys, a flexible member passing around all of said pulleys and having a weight at each of its ends, a driving pulley around which said flexible member also passes, a movable pantograph carriage, and an actuating connection between said carriage and the driving pulley; substantially as described.

12. An etching machine comprising a plurality of rotary article supports, having pulleys, a flexible member passing around all of said pulleys and having a weight at each of its ends, a driving pulley around which said flexible member also passes, a movable pantograph carriage, and an actuating connection between said carriage and the driving pulley, said actuating connection including a clutch member; substantially as described.

13. An etching machine comprising a plurality of rotary article supports having pulleys, a flexible member passing around all of said pulleys and having a weight connected to each of its ends, a driving pulley around which said member also passes, a movable pantograph carriage, another pulley, a flexible member connected to the carriage and passing around the last named pulley, a weight attached to the end of the last named flexible connection, a pulley connected to the driving pulley, a pulley connected to the second named pulley, and a flexible member passing around the third and fourth pulleys and having a weight at each end; substantially as described.

14. An etching machine comprising a plurality of rotary article supports having pulleys, a flexible member passing around all of said pulleys and having a weight connected to each of its ends, a driving pulley around which said member also passes, a movable pantograph carriage, another pulley, a flexible member connected to the carriage and passing around the last named pulley, a weight attached to the end of the last named flexible connection, a pulley connected to the driving pulley, a pulley connected to the second named pulley, and a flexible member passing around the third and fourth pulleys and having a weight at each end, and there being a clutch connection between the driving pulley and the pulley to which it is connected; substantially as described.

15. An etching machine comprising a plurality of rotatable article supports arranged in two series at opposite sides of the center of the machine, a vertically movable etching frame arranged between the two series of article supports and carrying a plurality of etching tools, a pantograph carriage having a tracing point, and actuating connections between said carriage and the article supports and the etching frame; substantially as described.

16. In an etching machine, a vertically movable etching frame having a plurality of etching tools mounted thereon, a wedge device engaging each tool for effecting a retraction thereof, and a common actuating connection attached to all of the wedge devices and whereby the tools may be simultaneously retracted; substantially as described.

17. In an etching machine, a vertically movable etching frame having a plurality of etching tools mounted thereon, a wedge device engaging each tool for effecting a retraction thereof, and a common actuating connection attached to all of the wedge devices and whereby the tools may be simultaneously retracted, together with means for advancing the tools when the wedge devices are moved in the reverse direction; substantially as described.

18. An etching machine comprising a universally movable tracing carriage, a tracing point mounted thereon, said carriage having a fork device, a rocker shaft having an arm engaged by the fork device, another rocker shaft adjustably connected with the first named shaft, and a vertically movable etching frame connected to the last named shaft; substantially as described.

19. An etching machine comprising a universally movable tracing carriage, opposing weights for balancing the movements of said carriage, a rotatable article support, a flexible connection for rotating said support, a pulley for actuating said connection, and an actuating connection between the tracing carriage and said pulley; substantially as described.

20. An etching machine having a tool carrier provided with a sleeve, an etching tool slidably mounted in the sleeve, and a weighted lever engaging the shank of said tool for holding the tool to its work; substantially as described.

In testimony whereof, I have hereunto set my hand.

ELMER BELL.

Witnesses:
J. LLOYD KALP,
K. M. KALP.

---

Copies of this patent may be obtained for five cents each, by addressing the "Commissioner of Patents Washington, D. C."